(12) United States Patent
Dronen et al.

(10) Patent No.: US 11,263,549 B2
(45) Date of Patent: Mar. 1, 2022

(54) METHOD, APPARATUS, AND SYSTEM FOR IN-VEHICLE DATA SELECTION FOR FEATURE DETECTION MODEL CREATION AND MAINTENANCE

(71) Applicant: HERE GLOBAL B.V., Eindhoven (NL)

(72) Inventors: Nicholas Dronen, Chicago, IL (US); Stephen O'Hara, Chicago, IL (US); Vladimir Shestak, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 118 days.

(21) Appl. No.: 15/933,013

(22) Filed: Mar. 22, 2018

(65) Prior Publication Data

US 2019/0295003 A1    Sep. 26, 2019

(51) Int. Cl.
| | |
|---|---|
| *G06N 20/00* | (2019.01) |
| *G05D 1/00* | (2006.01) |
| *G05D 1/02* | (2020.01) |
| *G06N 5/04* | (2006.01) |
| *G06N 7/00* | (2006.01) |

(Continued)

(52) U.S. Cl.
CPC ........... *G06N 20/00* (2019.01); *G05D 1/0088* (2013.01); *G05D 1/0221* (2013.01); *G06K 9/00791* (2013.01); *G06K 9/00979* (2013.01); *G06K 9/00993* (2013.01); *G06K 9/6256* (2013.01); *G06N 5/047* (2013.01); *G06N 7/00* (2013.01)

(58) Field of Classification Search
CPC .......... G06N 20/00; G06N 5/047; G06N 7/00; G05D 1/0088; G05D 1/0221; G01C 21/005; G07C 5/008; G06K 9/00791; G06K 9/00993; G06K 9/6256

USPC ............................................ 701/27, 446, 117
See application file for complete search history.

(56) References Cited

U.S. PATENT DOCUMENTS

| | | | |
|---|---|---|---|
| 9,275,136 B1 | 3/2016 | Sharifi et al. | |
| 9,384,402 B1* | 7/2016 | Furman | G06K 9/00805 |
| 9,405,976 B2* | 8/2016 | Dunlop | G06K 9/6215 |

(Continued)

FOREIGN PATENT DOCUMENTS

| | | |
|---|---|---|
| DE | 102016003969 A1 | 10/2017 |
| WO | 2014032660 A1 | 3/2014 |

(Continued)

OTHER PUBLICATIONS

Office Action for related European Patent Application No. 19163437.7-1207, dated Jul. 11, 2019, 9 pages.

(Continued)

*Primary Examiner* — Isaac G Smith
(74) *Attorney, Agent, or Firm* — Ditthavong, Steiner & Mlotkowski

(57) ABSTRACT

An approach is provided for selecting training observations for machine learning models. The approach involves determining a first distribution of a plurality of features observed in the training data set, and a second distribution of the plurality of features observed in the candidate pool of observations. The approach further involves selecting one or more observations in the candidate pool of observations for annotation based on the first distribution and the second distribution. The approach further involves adding the one or more observations to the training data set after annotation. The training data set is used for training the machine learning model.

20 Claims, 8 Drawing Sheets

(51) Int. Cl.
   *G06K 9/00* (2022.01)
   *G06K 9/62* (2022.01)

(56) References Cited

U.S. PATENT DOCUMENTS

| | | |
|---|---|---|
| 9,489,635 B1 | 11/2016 | Zhu |
| 9,563,199 B1 | 2/2017 | Ferguson et al. |
| 2005/0288827 A1* | 12/2005 | Watkins ............... G01C 21/26 701/1 |
| 2008/0091339 A1 | 4/2008 | Nagase et al. |
| 2012/0121161 A1* | 5/2012 | Eade .................... G09B 29/007 382/153 |
| 2016/0073229 A1 | 3/2016 | Haro et al. |
| 2016/0358475 A1 | 12/2016 | Prokhorov |
| 2018/0012082 A1* | 1/2018 | Satazoda ............ G06K 9/00805 |
| 2018/0053102 A1 | 2/2018 | Martinson et al. |
| 2018/0224284 A1* | 8/2018 | Danford ................ G01C 21/32 |
| 2018/0314921 A1* | 11/2018 | Mercep ................. G01S 13/862 |
| 2018/0349744 A1* | 12/2018 | Schulz ................. G06K 9/6267 |
| 2019/0197325 A1* | 6/2019 | Reiley .................... G08B 21/24 |

FOREIGN PATENT DOCUMENTS

| | | | |
|---|---|---|---|
| WO | 2018015811 A1 | 1/2018 | |
| WO | WO-2018015811 A1 * | 1/2018 | ......... G06K 9/00791 |

OTHER PUBLICATIONS

Sivaraman et al., "Active Learning Based Robust Monocular Vehicle Detection for On-road Safety Systems", Intelligent Vehicles Symposium, 2009, retrieved on Jan. 25, 2018 from http://cvrr.ucsd.edu/publications/2009/sivaraman_IV09.pdf, 6 Pages.
Office Action for related European Patent Application No. 19 193 437.7-1207, dated May 12, 2020, 9 pages.
Office Action for related European Patent Application No. 19 163 437.7-1207, dated Jun. 25, 2021, 5 pages.

* cited by examiner

METHOD, APPARATUS, AND SYSTEM FOR IN-VEHICLE DATA SELECTION FOR FEATURE DETECTION MODEL CREATION AND MAINTENANCE

BACKGROUND

Increases in the scale and types of available data have accelerated advances in all areas of statistical pattern matching such as machine learning. This is particularly true in the field of mapping, navigation, and autonomous driving where vehicle sensor data can be processed to identify environmental features. However, as vehicles (e.g., autonomous vehicles) become more commonly equipped with advanced sensors, the amount of available sensor data for feature detection and training related models continues to grow. This growth, in turn, can place significant burdens on computing resources available to process the data. Accordingly, service providers face significant technical challenges to more efficiently use computing resources to process sensor data for feature detection.

SOME EXAMPLE EMBODIMENTS

Therefore, there is a need for an approach for in-vehicle data selection for automated driving environment model creation and maintenance.

According to one embodiment, a computer-implemented method comprises processing, by an in-vehicle feature detection device, sensor data collected by a vehicle to output a detected feature and a confidence metric for the detected feature. The method also comprises transmitting the sensor data over a communication network from the vehicle to an external server based on determining that the confidence metric is below a confidence threshold. In one embodiment, the transmitted sensor data is used to initiate a creation or a re-training of a feature detection model. Further, the creation or the re-training of the feature detection model occurs externally with respect to the vehicle.

According to another embodiment, an apparatus comprises at least one processor, and at least one memory including computer program code for one or more computer programs, the at least one memory and the computer program code configured to, with the at least one processor, cause, at least in part, the apparatus to process, by an in-vehicle feature detection device, sensor data collected by a vehicle to output a detected feature and a confidence metric for the detected feature. The apparatus is also caused to transmit the sensor data over a communication network from the vehicle to an external server based on determining that the confidence metric is below a confidence threshold. In one embodiment, the transmitted sensor data is used to initiate a creation or a re-training of a feature detection model. Further, the creation or the re-training of the feature detection model occurs externally with respect to the vehicle.

According to another embodiment, a non-transitory computer-readable storage medium carries one or more sequences of one or more instructions which, when executed by one or more processors, cause, at least in part, an apparatus to process, by an in-vehicle feature detection device, sensor data collected by a vehicle to output a detected feature and a confidence metric for the detected feature. The apparatus is also caused to transmit the sensor data over a communication network from the vehicle to an external server based on determining that the confidence metric is below a confidence threshold. In one embodiment, the transmitted sensor data is used to initiate a creation or a re-training of a feature detection model. Further, the creation or the re-training of the feature detection model occurs externally with respect to the vehicle.

According to another embodiment, an apparatus comprises means for processing, by an in-vehicle feature detection device, sensor data collected by a vehicle to output a detected feature and a confidence metric for the detected feature. The apparatus also comprises means for transmitting the sensor data over a communication network from the vehicle to an external server based on determining that the confidence metric is below a confidence threshold. In one embodiment, the transmitted sensor data is used to initiate a creation or a re-training of a feature detection model. Further, the creation or the re-training of the feature detection model occurs externally with respect to the vehicle.

According to another embodiment, a computer-implemented method comprises receiving sensor data from a vehicle. The sensor data is transmitted from the vehicle based on a determination by an in-vehicle feature detection device that a feature detected in the sensor data has a confidence metric that is below a confidence threshold. The method also comprises processing the sensor data to create or re-train a feature detection model. The method further comprises deploying the feature detection model to the in-vehicle feature detection device of the vehicle to replace an initial feature detection model used by the in-vehicle feature detection device.

According to another embodiment, an apparatus comprises at least one processor, and at least one memory including computer program code for one or more computer programs, the at least one memory and the computer program code configured to, with the at least one processor, cause, at least in part, the apparatus to receive sensor data from a vehicle. The sensor data is transmitted from the vehicle based on a determination by an in-vehicle feature detection device that a feature detected in the sensor data has a confidence metric that is below a confidence threshold. The apparatus is also caused to process the sensor data to create or re-train a feature detection model. The apparatus is further caused to deploy the feature detection model to the in-vehicle feature detection device of the vehicle to replace an initial feature detection model used by the in-vehicle feature detection device.

According to another embodiment, a non-transitory computer-readable storage medium carries one or more sequences of one or more instructions which, when executed by one or more processors, cause, at least in part, an apparatus to receive sensor data from a vehicle. The sensor data is transmitted from the vehicle based on a determination by an in-vehicle feature detection device that a feature detected in the sensor data has a confidence metric that is below a confidence threshold. The apparatus is also caused to process the sensor data to create or re-train a feature detection model. The apparatus is further caused to deploy the feature detection model to the in-vehicle feature detection device of the vehicle to replace an initial feature detection model used by the in-vehicle feature detection device.

According to another embodiment, an apparatus comprises means for receiving sensor data from a vehicle. The sensor data is transmitted from the vehicle based on a determination by an in-vehicle feature detection device that a feature detected in the sensor data has a confidence metric that is below a confidence threshold. The apparatus also comprises means for processing the sensor data to create or re-train a feature detection model. The apparatus further comprises means for deploying the feature detection model to the in-vehicle feature detection device of the vehicle to replace an initial feature detection model used by the in-vehicle feature detection device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for in-vehicle data selection for feature detection model creation and maintenance are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
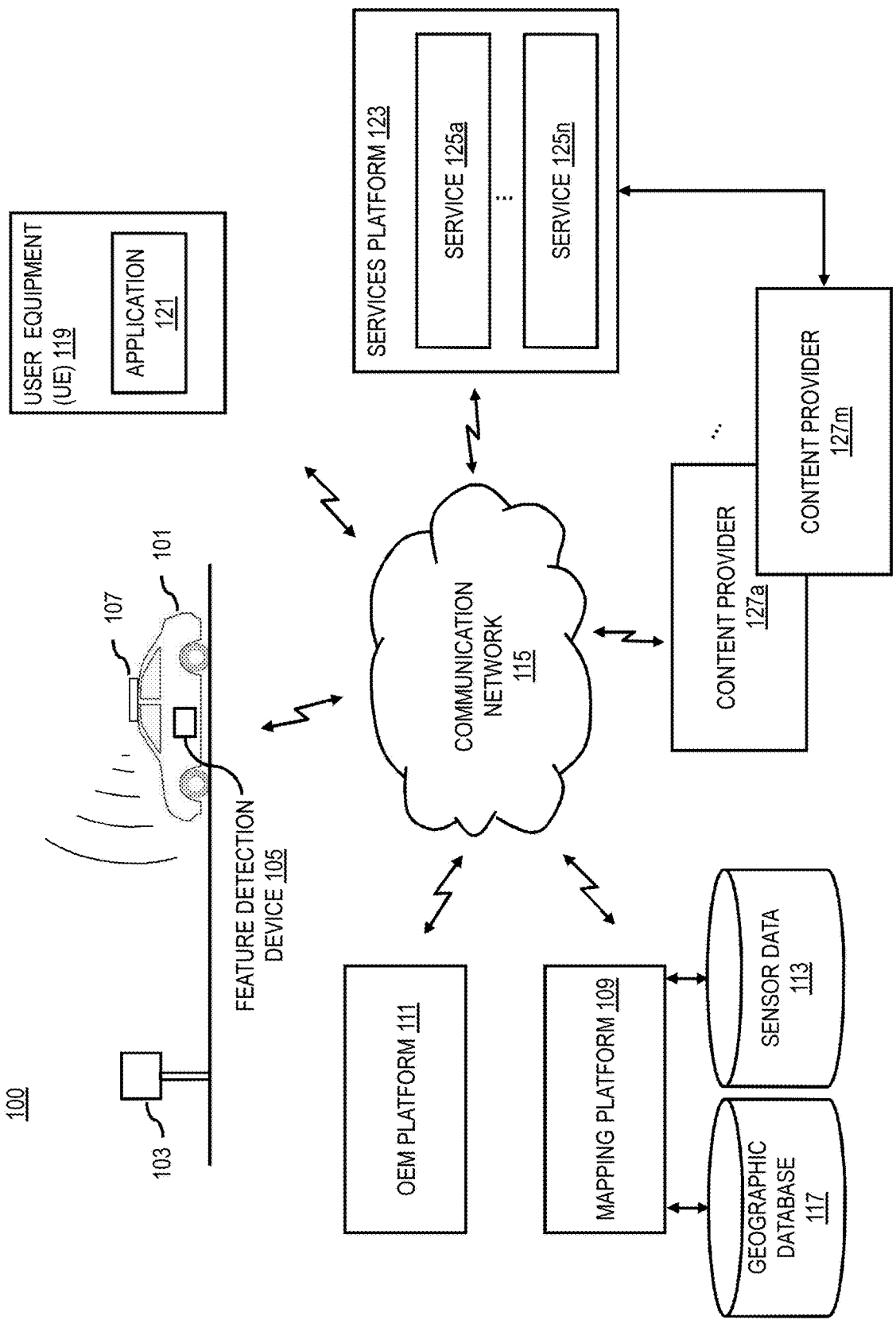
FIG. 1 is a diagram of a system capable of in-vehicle data selection for feature detection model creation and maintenance, according to one embodiment.

FIG. 1 is a diagram of a system capable of in-vehicle data selection for feature detection model creation and maintenance, according to one embodiment. While it is assumed that highly automated driving will be adopted in the future, the pace and scope of that adoption remain points of contention. A prerequisite of the high automation of a vehicle's driving function (e.g., of a vehicle 101 as shown in FIG. 1) is that the vehicle has an accurate model of its environment. For example, an environment model consists of objects (e.g., an object 103) that a vehicle 101 should be aware of in order to proceed safely, such as lane markings, signs, and road barriers. Traditionally, statistical pattern-matching devices (e.g., a feature detection device 105 in the vehicle 101)—support vector machines (SVMs), neural networks, or other equivalent machine learning models, for instance—can very effectively identify the objects in an environment based on data captured by optical, radar, or ultrasonic sensors (e.g., sensors 107 of the vehicle 101). This can make a feature detection device 105 useful for automating the creation and maintenance of environment models for automated driving systems.

In one embodiment, for a feature detection device 105 (or any other statistical pattern-matching device) to be an effective aid in the creation and maintenance of maps for highly automated driving, it should demonstrate a high degree of accuracy at identifying relevant objects 103 in a sensor reading. Generally, for a feature detection device 105 to attain high accuracy, it must be given a large number of sensor readings annotated with the types and locations of the objects 103 (i.e., ground truth data). The process of annotating sensor readings is usually performed by human laborers, an often slow and costly process. The number of consumer vehicles 101 equipped with driving automation technology is increasing. This bodes well for the acquisition of sensor readings to improve the quality of feature detection devices 105. Indeed, it is possible that there will be vastly more sensor readings than the system 100 of FIG. 1 needs to train feature/object detection models used by the feature detection devices 105, and that the majority of new sensor readings will contain little new information with respect to training the detection models. To avoid excessively spending on human annotation, service providers (e.g., map service providers operating a mapping platform 109, original equipment manufacturers (OEM) operating an OEM platform 111, and/or the like) face significant technical challenges to automatically and intelligently select from a large set of sensor readings a smaller set that is most likely to increase the accuracy of the statistical pattern-matching devices (e.g., the feature detection devices 105). Further, to avoid profligacy in both data transmission from the vehicle 101 and data storage in the cloud, the service providers face further technical challenges minimize the number and size of sensor readings that are transmitted from vehicles 101 to a data center (e.g., the OEM platform 111 and/or the mapping platform operating a server-side sensor database 113) over a communication network 115.

To address these technical problems, the system 100 of FIG. 1 introduces a capability to determine which data captured by a vehicle is most likely to improve the feature detection devices 105 that can potentially be fundamental to the creation and maintenance of a map of the driving environment (e.g., mapping data stored a geographic database 117). In one embodiment, the system 100 employs the feature detection device 105 in the vehicle 101 itself to choose which sensor readings to transmit externally from the vehicle 101 (e.g., to external server-side components such as the OEM platform 111 or mapping platform 109). The feature detection device 105, for instance, is capable of emitting an uncertainty (e.g., a confidence metric) associated with road features or objects that it detects from the sensor readings or data. This uncertainty or confidence metric can be a proxy for how unfamiliar a particular instance of the collected sensor data is to the feature detection device 105. For example, higher uncertainty values for predicted features or object (or equivalently lower confidence metrics or probabilities of detections) can mean that the feature detection device 105 is using a trained feature detection model that that may not capable of accurately Therefore, in one embodiment, the feature detection device 105 can use the uncertainty or confidence metric to select what sensor data to transmit from vehicle 101, thereby resulting in only the most useful data being transmitted to external servers. In this case, "useful" data refers to sensor data that include features that cannot be predicted with a target level of uncertainty or confidence. Sensors data with predicted features associated with high uncertainties or low confidence metrics can then be used as candidates for generating a new feature detection model or re-training a current feature detection model to improve prediction accuracy. Conversely, sensor data for which the feature detection device 105 can already make accurate predictions are not likely to result improvements when using such data to retrain the feature prediction model. Embodiments of this selective transmission of sensor data advantageously allows the vehicle owner or the manufacturer (i.e., OEM) to minimize wireless data transmission costs associated with collecting sensor data from vehicles 101 for creating feature detection models. In addition, service providers (e.g., map-ping providers) that use the collected sensor data can also minimize data transmission and storage costs, thereby ensuring that the data that the mapping service providers pay for or commit resources (e.g., computing resources, bandwidth resources, storage resources, etc.) to transmit and store only those data that are likely to result in improving feature detection models. Absent this approach, a larger number of sensor readings would need to be wirelessly transmitted from the vehicle 101 to the external services or data centers (e.g., OEM platform 111 and/or mapping platform 109). Then, once in the mapping platform 109's possession, the sensor data 117 would then need to be analyzed to identify the most informative ones.

Figure 2:
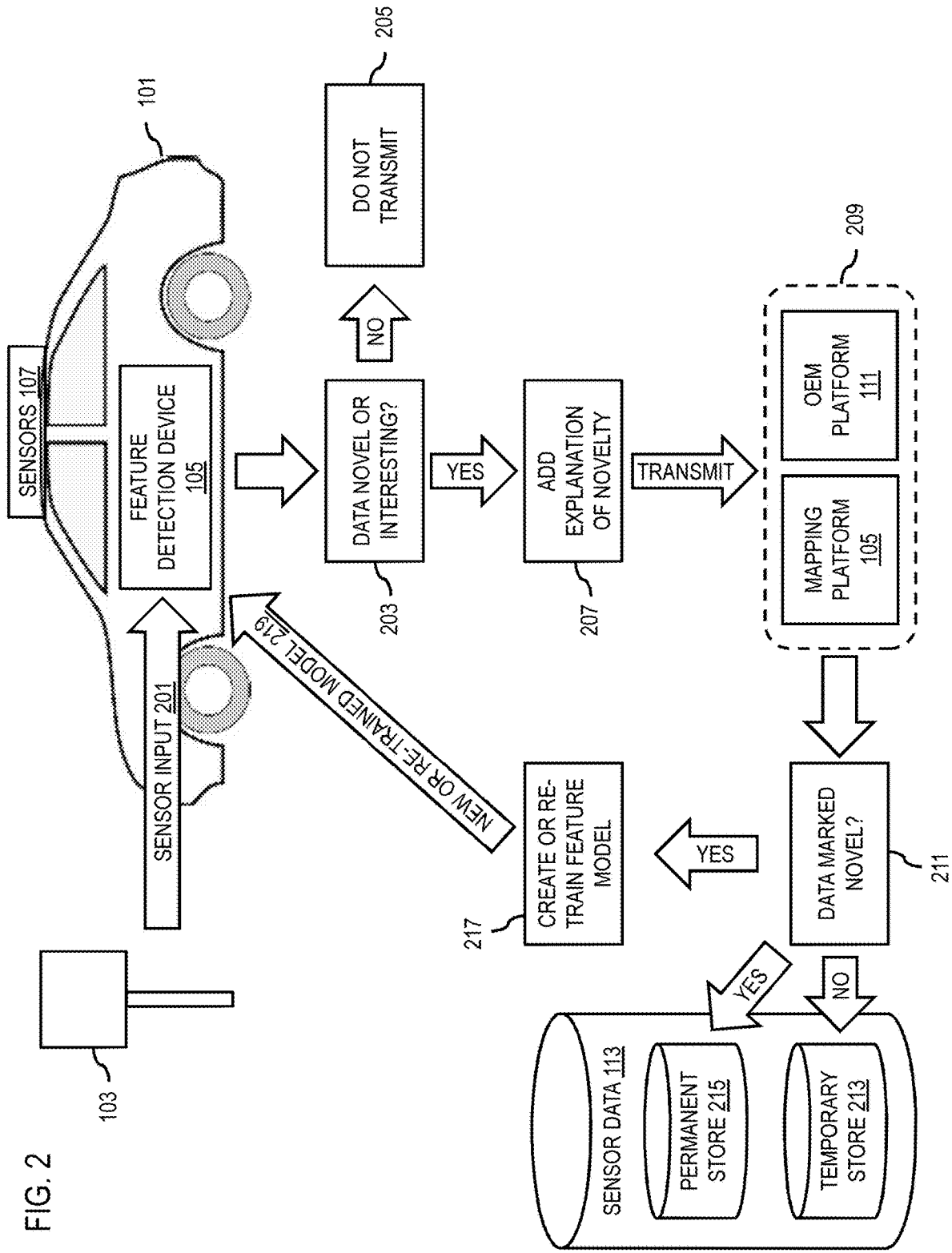
FIG. 2 is a diagram illustrating interactions among components of the system 100 to support in-vehicle data selection for model creation and maintenance, according to one embodiment.

FIG. 2 is a diagram illustrating example interactions among components of the system 100 to support in-vehicle data selection for model creation and maintenance, according to one embodiment. For example, as shown in the example of FIG. 2, the vehicle 101 uses its sensors 107 (e.g., a camera, radar, LiDAR, etc.) to capture a sensor input 201 (e.g., sensor readings or data) depicting an object 103 (e.g., a road sign). In one embodiment, the feature detection device 105 uses a trained feature detection model (e.g., SVM, neural network, etc.) to process the sensor input 201 to detect the road object 103. The feature detection device 105 (e.g., in-vehicle pattern-matching device) emits both its judgment about whether and where the road object 103 exists in the sensor data, and its confidence or uncertainty in the judgment itself.

At process 203, the feature detection device 105 uses a calibrated threshold to determine whether the confidence of the predicted feature is sufficiently low (or uncertainty sufficiently high) to warrant transmission. Meeting this threshold, for instance, indicates that the collected sensor data may be novel or interesting with respect training the feature detection device 105. If the threshold is not met, the feature detection device 105 does not transmit the sensor data to advantageously reduce data transmission and related resources (process 205). If the threshold is met, the feature detection device 105 can add an explanation to the sensor data (e.g., in a data record or as a flag) to explain or otherwise indicate the novelty of the sensor data (process 207).

At process 209, the sensor is then transmitted externally from the vehicle 101. In one embodiment, the sensor data is transmitted from the vehicle 101 to the OEM platform 111 (e.g., the vehicle's manufacturer). The OEM platform 111 can then relay the sensor data to the mapping platform 109 for use. The OEM platform 111 can optionally process the received sensor data (e.g., anonymize, aggregate into batches, categorize, etc.) before transmitting the sensor data to the mapping platform 109. In another embodiment, the sensor data can be transmitted directly from the vehicle 101 to the mapping platform 109. In cases where transmission of raw sensor data is not possible due to privacy laws and/or policies that may be in place, conditions (e.g., environmental conditions) that may have contributed to the low confidence of predicted features—time of day, weather, or location, for instance—may be transmitted in lieu of the raw sensor data. This can increase the chances of obtaining data similar to the data that yielded the low-confidence road feature detection by other means.

After receiving the sensor data, in embodiments where the sensor data is marked, the mapping platform 109 can determine or verify that the sensor is marked as novel. If the sensor data is not marked as novel, the mapping platform 109 can discard or otherwise store unmarked sensor in a temporary storage of 213 of the sensor database 113 (e.g., to use for purposes other than creating or maintaining a feature detection model). If the sensor data is marked, then the mapping platform 109 stores the sensor data in a permanent storage 215 of the sensor database 113. The stored sensor data can then be used to create or re-train a feature detection model (process 217). The mapping platform 109 can then deploy the created or re-trained feature detection model 219 to the feature detection device 105 of the vehicle 101. In this way, the FIG. 2 illustrates an example complete lifecycle of the embodiments described herein, from in-vehicle detections (e.g., sensor input 201) to re-training and re-deployment of the feature detection model 219). Additional embodiments are described in more detail below.

Figure 3:
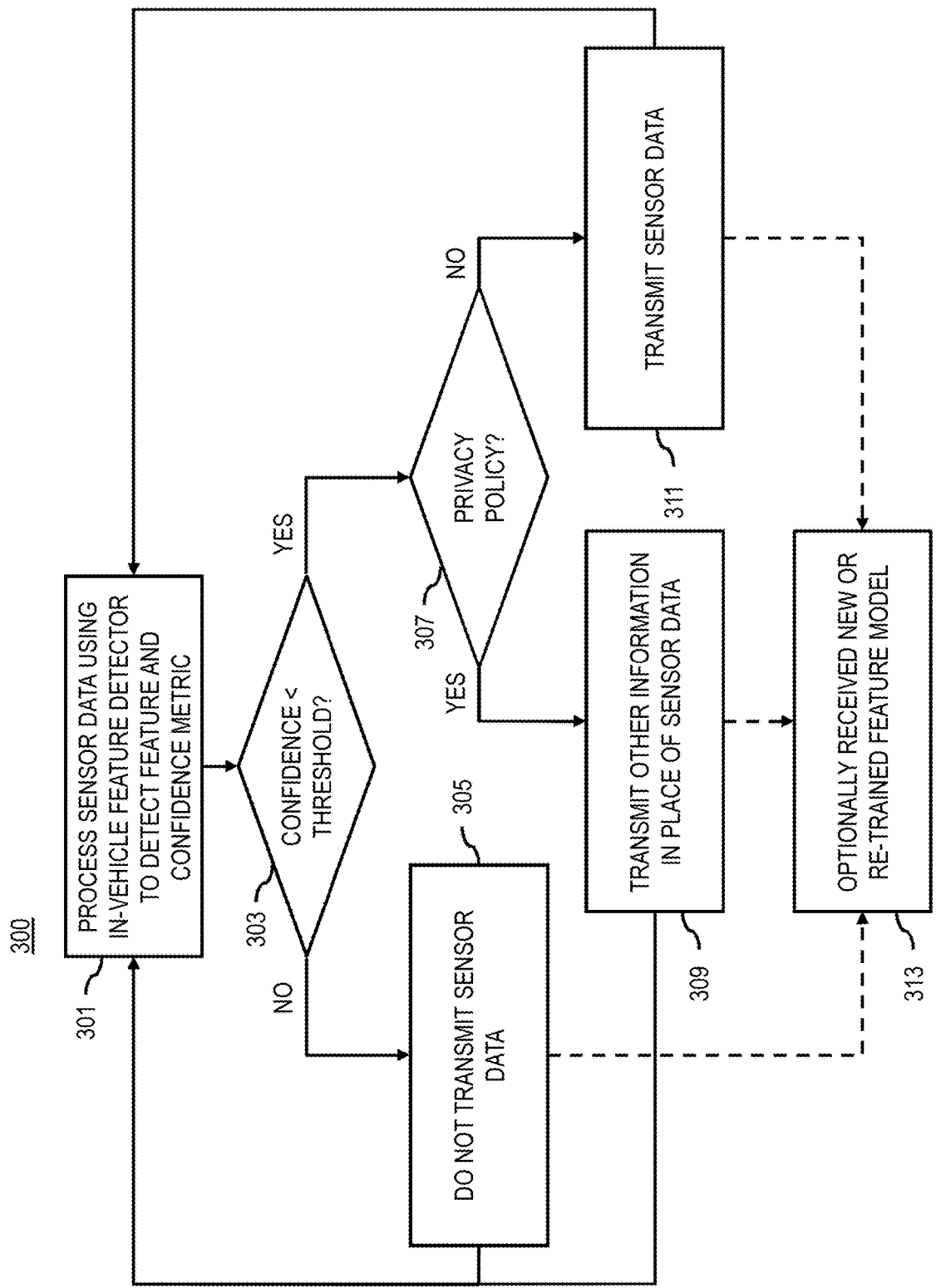
FIG. 3 is a flowchart of vehicle-side process for in-vehicle data selection for feature detection model creation and maintenance, according to one embodiment.
Figure 7:
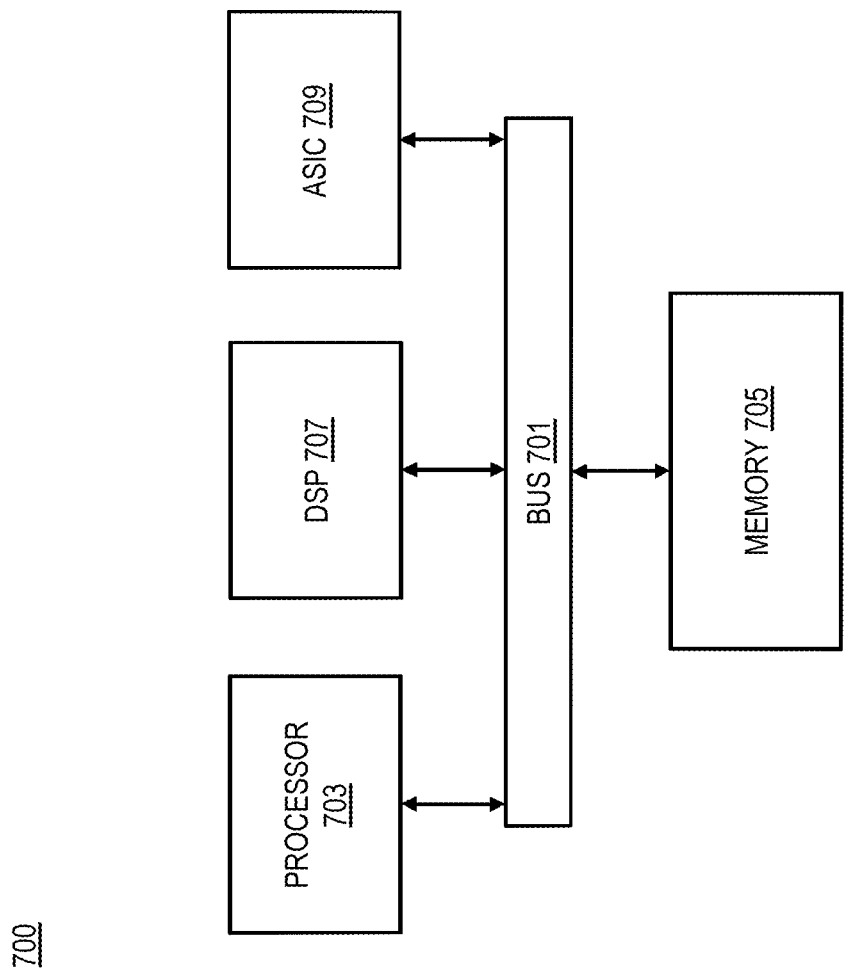
FIG. 7 is a diagram of a chip set that can be used to implement an embodiment.

FIG. 3 is a flowchart of vehicle-side process for in-vehicle data selection for feature detection model creation and maintenance, according to one embodiment. In one embodiment, the feature detection device 105 may perform one or more portions of the process 300 and may be implemented in, for instance, a chip set including a processor and a memory as shown in FIG. 7. As such, the feature detection device 105 can provide means for accomplishing various parts of the process 300. In addition or alternatively, the process 300 can be performed using any other component of the vehicle 101. In yet another embodiment, the process 300 can be performed by a user equipment (UE) device 119 (e.g., a mobile device executing one or more applications 121) alone or in combination with the feature detection device 105 and/or vehicle 101. For example, the UE 119 can be associated with the vehicle 101 and/or its driver/passengers, and can collect sensor data for feature detection. Although the process 300 is illustrated and described as a sequence of steps, it is contemplated that various embodiments of the process 300 may be performed in any order or combination and need not include all of the illustrated steps.

As discussed above, statistical pattern matching devices (e.g., the feature prediction device 105 using trained feature prediction models) enable a range of new services and functions including for applications such as autonomous driving. It is noted that although the various embodiments are discussed herein with respect to autonomous driving applications, it is contemplated that the various embodiments are applicable to any type of machine learning application, service, or function for which sensor is needed from a remote collection device. For example, with respect to autonomous driving, computer vision and computing power have enabled real-time mapping and sensing of a vehicle's environment.

For example, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions can occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using an in-vehicle feature detection device 105 facilitated, for instance, by machine learning processes and/or other statistical pattern matching models.

To facilitate this process, a vehicle 101 can not only collect data for real-time sensing for its own purposes, but also can contribute the data to the sensor database 113 so that improved feature detection models can be created or maintained. As noted above, training feature detection models generally requires a large set of annotated observations. In one embodiment, annotated observations can be data records or files representing or recording observations of a phenomenon that have been manually labeled with features or characteristics identified by an observer. For example, with training a feature detection model to detect objects or features depicted in images, an annotated observation can be an image that has been labeled with the objects or features as identified by a human labeler as being depicted in the corresponding image. The annotation process for other types of sensor data (e.g., radar, LiDAR, etc.) are analogous.

However, a large number of such labeled observations is often not sufficient to train an effective feature detection model. Just as important is the diversity of observations seen by the model during its training phase. A model which has only seen or been trained using many examples of the same type of observation can have a difficult time generalizing to different types of observations, while a model which has seen or been trained on several examples of many types of observation will generalize better. Moreover, labeling or annotating a large number of observations of the same type can lead to inefficient use of resources that can be more effectively used to label or annotate a wider range of observations of different types to improve the model generalization. In other words, given the scale and speed with which sensor data readings can be generated with advanced vehicle sensors 107, the annotation effort has become a precious resource to be optimized. The process 300 is an example of one embodiment for selecting sensor data that are more likely to be unfamiliar to the feature detection device 105 to more efficiently use training resources.

Accordingly, in step 301, as a vehicle 101 travels a road network, the vehicle 101 can collect sensor data to create an environment model of its surrounding comprising the objects and/or feature near the vehicle 101's location. As the sensor data is collected, the feature detection device 105 (e.g., an in-vehicle feature detector of a vehicle 101) processes sensor data collected by the vehicle 101 to output a detected feature and a confidence metric for the detected feature. In one embodiment, the feature detection device 105 uses a feature detection model to detect features and associated confidence metric. By way of example, feature detection models can include, but are not limited to, SVM or neural networks. Generally, a feature detection model (e.g., a set of equations, statistical patterns, rules, decision trees, etc.) manipulates an input feature set to make a prediction about the feature set or the phenomenon/observation that the feature set represents. The feature detection device 105 can use any means known in the art to detect features in input sensor data (e.g., image recognition, etc.) readings. As used herein, a sensor reading can include any data file or data object representing an observed phenomenon from which features can be extracted, and the features can include any property or characteristic of the data item or observed phenomenon. For example, a sensor reading can be an input image of a forward-facing view from the vehicle 101, and the features can include objects of interest for mapping or navigation (e.g., lane markings, signs, other vehicles, etc.). When such statistical pattern matching or feature prediction models are used to predict whether an image depicts or is otherwise associated with a certain features or objects, they can also compute a confidence or probability that the predicted feature is likely to be true (e.g., a confidence metric).

In step 303, the feature detection device 105 determines whether the confidence metric is below a confidence threshold. As discussed above, the confidence threshold defines when a sensor reading or sensor data is considered novel or interesting for the purposes of creating or maintaining a feature detection model. In one embodiment, the confidence threshold can be calibrated to or based on various including but not limited to resource availability (e.g., a data storage threshold, a transmission bandwidth threshold, etc.), a data sparsity at a target location, or a combination thereof. For example, if fewer new sensor readings or observations are desired because there is less available storage or fewer transmissions are desired, the confidence threshold can be set to be more restrictive, e.g., so that the features detected in the sensor data reading must be predicted with lower confidence or probability (e.g., higher uncertainty) to be transmitted and used for creating or re-training a feature detection model, and vice versa. In yet another embodiment, if data sparsity is an issue (e.g., few sensor readings are available for a particular area or region), the confidence threshold for that area or region of interest can be relaxed, so that more sensor data observations will be reported from the area or region.

If the confidence metric is not below the confidence threshold, the feature detection device 105 does not transmit the sensor data externally from the vehicle (step 305) and returns to step 301 to process additional sensor data (if any).

If the confidence metric is below the confidence threshold, the feature detection device 105 transmit the sensor data externally from the vehicle (e.g., to the OEM platform 111 or mapping platform 109).

In one embodiment, prior to transmitting the sensor data, the feature detection device 105 can optionally mark the sensor data with a data record to indicate that the sensor data is novel based on determining that the confidence metric is below a confidence threshold. In this way, the external server determines whether to store or process the sensor data based on the marking of the sensor data as previously described.

In yet another embodiment, prior to transmitting the sensor data, the feature detection device 105 can determine whether a privacy law or policy that restricts transmission of the sensor data is implemented at the vehicle 101 or the feature detection device 105 itself (step 307). If such a privacy policy is implemented, the feature detection device 105 transmits other information associated with the sensor data from the vehicle to the external server in place of the sensor data based on determining that the confidence metric is below a confidence threshold. By way of example, the other information includes contextual information associated with a collection of the sensor data, the vehicle, an environment surrounding the vehicle, or a combination thereof (step 309). In other words, instead of transmitting raw sensor data that may be prohibited by applicable privacy policies or laws, the feature detection device 105 can record environment or other conditions associated with capturing sensor data that was below the confidence threshold. In this way, the mapping platform 109 can identify the types of conditions can lead to poor feature detection accuracy, and request sensor data (e.g., from other sources) falling within those conditions to create or re-train feature prediction models for the feature detection device 105.

If no privacy policy is implemented, the feature detection device 105 can transmit the sensor data over a communication network from the vehicle 101 to an external server (e.g., OEM platform 111 and/or mapping platform 109) based on determining that the confidence metric is below the confidence threshold (step 311).

In one embodiment, the transmitting of the sensor data is further based on determining that a location where the sensor data is collected corresponds to a requested location specified by a mapping platform. For example, in some cases, the feature detection device 105 can be configured to collect sensor data from specific regions of interest. Accordingly, the feature detection device 105 can transmit sensor data collected only from those areas.

In one embodiment, the transmitted sensor data is used to initiate a creation or a re-training of a feature detection model. This creation or the re-training of the feature detection model occurs externally with respect to the vehicle 101 as further discussed in more detail below with respect to FIG. 4. In one embodiment, the feature detection model can then be deployed to the vehicle 101 to an initial feature detection model used by the in-vehicle feature detection device 105.

Figure 4:
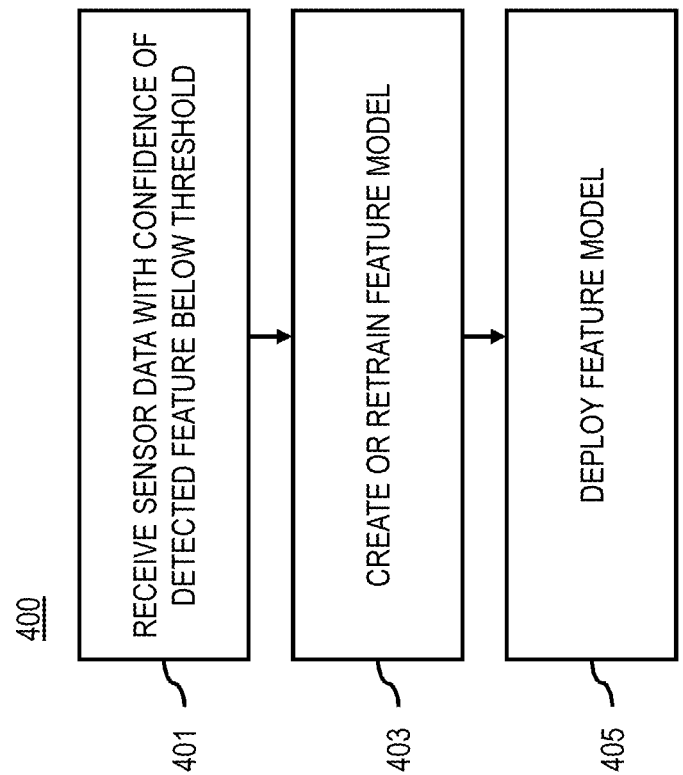
FIG. 4 is a flowchart of a server-side process for in-vehicle data selection for feature detection model creation and maintenance, according to one embodiment.

FIG. 4 is a flowchart of a server-side process for in-vehicle data selection for feature detection model creation and maintenance, according to one embodiment. In one embodiment, the mapping platform 109 and/or OEM platform 111 may perform one or more portions of the process 400 and may be implemented in, for instance, a chip set including a processor and a memory as shown in FIG. 7. As such, the mapping platform 109 and/or OEM platform 111 can provide means for accomplishing various parts of the process 400. In addition or alternatively, a services platform 123 and/or one or more services 125a-125n (also collectively referred to as services 125) may perform any combination of the steps of the process 400 in combination with the mapping platform 109 and/or OEM platform 111, or as standalone components. Although the process 400 is illustrated and described as a sequence of steps, it is contemplated that various embodiments of the process 400 may be performed in any order or combination and need not include all of the illustrated steps.

In step 401, the mapping platform 109 receives sensor data from a vehicle. In one embodiment, the sensor data is transmitted from the vehicle based on a determination by an in-vehicle feature detection device 105 that a feature detected in the sensor data has a confidence metric that is below a confidence threshold according to various embodiments described in the process 300 of FIG. 3.

In one embodiment, the mapping platform 109 stores the sensor data in a permanent storage based on determining that the sensor data is marked to indicate that the confidence metric for the feature detected in the sensor data is below the confidence threshold. Conversely, the mapping platform 109 stores the sensor data in a temporary storage based on determining that the sensor data is marked to indicate that the confidence metric for the feature detected in the sensor data is above the confidence threshold.

In one embodiment, the mapping platform 109 optionally transmits a request to the vehicle 101 to capture data from a geo-fenced region of interest. In this case, the sensor data is received in response to the request, and the sensor data is collected by the vehicle 101 from the geo-fenced region of interest. In one embodiment, the geo-fenced region of interest can be associated with a historical feature detection performance that is below a threshold performance, or an area with data sparsity. For example, if feature detection performance does not meet target accuracy levels in a region or area of the map, the mapping platform 109 can specify that region (e.g., as a geo-fence) and request that the vehicle

101 collect sensor data from that region to provide a greater potential pool of training data for improving feature prediction models.

As discussed above, in one embodiment, there may privacy laws or policies in place that restrict the transmission of raw sensor data from a vehicle 101. In this case, the mapping platform 109 can receive other information from the vehicle indicating one or more conditions associated with collecting the sensor data in place of the sensor data of the vehicle, the in-vehicle feature detection device, or a combination restricts transmitting the sensor data externally from the vehicle. The mapping platform 109 can then transmit a request for the vehicle (e.g., if the privacy should change to allow transmission) or another vehicle (e.g., not under the same privacy policy) to capture additional sensor data under the one or more conditions. For example, if other information received in place of the raw sensor data indicates that rainy weather conditions can result in increased uncertainty in predicted features, then additional sensor data collected under rainy weather conditions can be requested from other sources. Other example conditions can include metadata describing the circumstances of the collection of the sensor data observations including, but not limited to: the geographic location of the capture (a latitude/longitude pair), and/or other map features (e.g., features stored in the geographic database 117) associated with the geographic location of the capture. Other map features or attributes can include, for instance, a functional class, a speed category, etc. of the road link where the sensor data capture was taken.

In step 403, the mapping platform 109 processes the received sensor data to create or re-train a feature detection model. In one embodiment, the processing of the sensor data to create or re-train the feature detection model includes annotating the received sensor data (e.g., sensor data that includes a feature detected with the confidence metric below the confidence threshold) with one or more feature labels prior to creation or re-training of the model. As noted above, because the mapping platform 109 will have to expend resources on annotating just the sensor data with high uncertainties or low confidence metrics, the mapping platform 109 can more efficiently focus its resources on labeling just the portion of the sensor data that are likely to provide the greatest improvement in model accuracy. The resulting labeled sensor data represents, for instance, ground truth data for creating or re-training the feature detection model.

For example, with respect to a use case of feature detection from imagery data, the training or ground data truth data can include a set of images that have been manually marked or annotated with feature labels to indicate examples of the features or objects of interest. A manually marked feature that is an object (e.g., lane markings, road signs, etc.), for instance, can be a polygon or polyline representation of the feature that a human labeler has visually detected in the image. In one embodiment, the polygon, polyline, and/or other feature indicator can outline or indicate the pixels or areas of the image that the labeler designates as depicting the labeled feature.

In one embodiment, the mapping platform 109 can then create or re-train the feature detection model using the labeled sensor data set. For example, the mapping platform 109 can incorporate a supervised learning model (e.g., a logistic regression model, RandomForest model, and/or any equivalent model) to provide feature matching probabilities or statistical patterns that are learned from the labeled sensor data set. For example, during training, the mapping platform 109 uses a learner module that feeds feature sets from the labeled sensor data set into the feature detection model to compute a predicted matching feature using an initial set of model parameters. The learner module then compares the predicted matching probability and the predicted feature to the ground truth data (e.g., the manually annotated feature labels) in the labeled sensor data set. The learner module then computes an accuracy of the predictions for the initial set of model parameters. If the accuracy or level of performance does not meet a threshold or configured level, the learner module incrementally adjusts the model parameters until the model generates predictions at a desired or configured level of accuracy with respect to the manually annotated labels in the training data (e.g., the ground truth data). In other words, a "trained" feature prediction model is a classifier with model parameters adjusted to make accurate predictions with respect to the labeled sensor data set.

After the feature detection model is created or re-trained, the mapping platform 109 deploys the feature detection model to the in-vehicle feature detection device 105 of the vehicle 101 to replace an initial feature detection model used by the in-vehicle feature detection device 105. In one embodiment, the mapping platform 109 can deploy the feature detection model directly or indirectly to the feature detection device 105 using any means known in the art (e.g., push deployment, pull deployment, over-the-air (OTA) transfer, etc.). In addition, direct deployment refers to a direct transmission of the model from the mapping platform 109 to the in-vehicle feature detection device 105. Indirect deployment refers, for instance, to the mapping platform 109 providing the feature model to an intermediate server or device (e.g., OEM platform 111, services platform 123, services 125, etc.) that can then provide the model to the feature detection device 105.

Returning to FIG. 1, as shown, the system 100 includes the feature detection device 105 and/or mapping platform 109 for providing in-vehicle data selection for feature detection model creation and maintenance according the various embodiments described herein. In some use cases, the mapping platform 109, feature detection device 105, vehicle 101, and/or sensors 107 can be part of a computer vision system configured to use machine learning to detect objects or features depicted in sensor data. For example, with respect to autonomous, navigation, mapping, and/or other similar applications, the feature detection device 105 can detect road features (e.g., lane lines, signs, etc.) in input sensor data and generate associated prediction confidence values (e.g., confidence metrics, uncertainty values, etc.), according to the various embodiments described herein. In one embodiment, the feature detection device 105 and/or mapping platform 109 can include one or more statistical pattern matching or feature detection models such as, but not limited to, SVMs, neural networks, etc. to make feature predictions. For example, when the sensor data include images used for environment modeling, the features of interest can include lane lines in image data to support localization of, e.g., a vehicle 101 within the sensed environment. In one embodiment, the neural network of the system 100 is a traditional convolutional neural network which consists of multiple layers of collections of one or more neurons (e.g., processing nodes of the neural network) which are configured to process a portion of input sensor data. In one embodiment, the receptive fields of these collections of neurons (e.g., a receptive layer) can be configured to correspond to the area of the input sensor data.

In one embodiment, the feature detection device 105 and/or mapping platform 109 also have connectivity or access to a geographic database 117 which stores representations of mapped geographic features to facilitate autonomous driving and/or other mapping/navigation-related applications or services. The geographic database 117 can also store parametric representations of lane lines and other similar features and/or related data generated or used to encode or decode parametric representations of lane lines according to the various embodiments described herein.

In one embodiment, the feature detection device 105 and/or mapping platform 109 have connectivity over a communication network 115 to the services platform 123 that provides one or more services 125. By way of example, the services 125 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 125 uses the output of the feature detection device 105 and/or mapping platform 109 (e.g., detected features) to model an environment of the vehicle 101, localize the vehicle 101 or UE 119 (e.g., a portable navigation device, smartphone, portable computer, tablet, etc.) to provide services 125 such as navigation, mapping, other location-based services, etc.

In one embodiment, the feature detection device 105 and/or mapping platform 109 may be a platform with multiple interconnected components. The feature detection device 105 and/or mapping platform 109 may include multiple servers, intelligent networking devices, computing devices, components and corresponding software for providing parametric representations of lane lines. In addition, it is noted that the feature detection device 105 and/or mapping platform 109 may be a separate entity of the system 100, a part of the one or more services 125, a part of the services platform 123, or included within the UE 119 and/or vehicle 101.

In one embodiment, content providers 127a-127m (collectively referred to as content providers 127) may provide content or data (e.g., including geographic data, parametric representations of mapped features, etc.) to the geographic database 117, the feature detection device 105, the mapping platform 109, the services platform 123, the services 125, the UE 119, the vehicle 101, and/or an application 121 executing on the UE 119. The content provided may be any type of content, such as map content, textual content, audio content, video content, image content, etc. In one embodiment, the content providers 127 may provide content that may aid in the detecting and classifying of lane lines and/or other features in image data, and estimating the quality of the detected features. In one embodiment, the content providers 127 may also store content associated with the geographic database 117, feature detection device 105, mapping platform 109, services platform 123, services 125, UE 119, and/or vehicle 101. In another embodiment, the content providers 127 may manage access to a central repository of data, and offer a consistent, standard interface to data, such as a repository of the geographic database 117.

In one embodiment, the UE 119 and/or vehicle 101 may execute a software application 121 to collect, encode, and/or decode feature data detected in image data to select training observations for machine learning models according the embodiments described herein. By way of example, the application 121 may also be any type of application that is executable on the UE 119 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the feature detection device 105 and/or mapping platform 109 and perform one or more functions associated with in-vehicle data selection for feature detection model creation and maintenance.

By way of example, the UE 119 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 119 can support any type of interface to the user (such as "wearable" circuitry, etc.). In one embodiment, the UE 119 may be associated with the vehicle 101 or be a component part of the vehicle 101.

In one embodiment, the UE 119 and/or vehicle 101 are configured with various sensors for generating or collecting environmental sensor data (e.g., for processing by the feature detection device 105 and/or mapping platform 109), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 119 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 119 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 119 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the feature detection device 105, mapping platform 109, services platform 123, services 125, UE 119, vehicle 101, and/or content providers 127 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
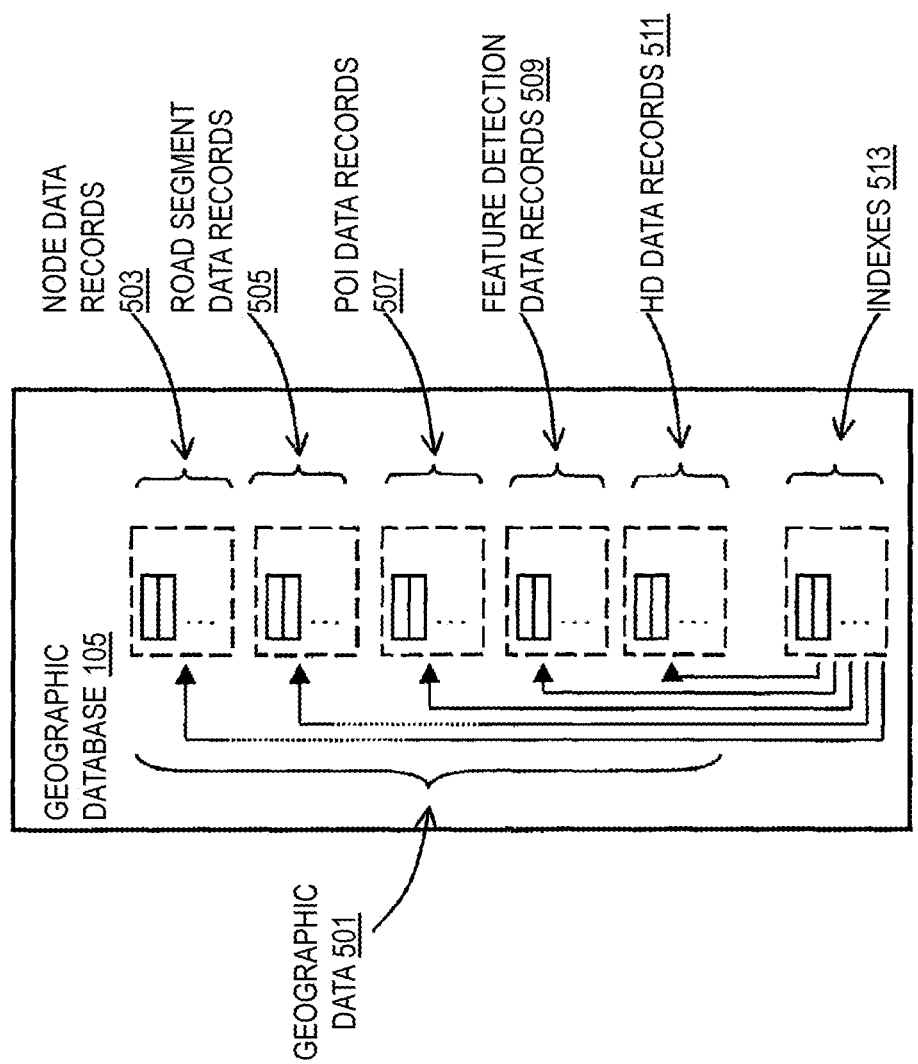
FIG. 5 is a diagram of a geographic database, according to one embodiment.

FIG. 5 is a diagram of a geographic database, according to one embodiment. In one embodiment, the geographic database 117 includes geographic data 501 used for (or configured to be compiled to be used for) mapping and/or navigation-related services, such as for video odometry based on the parametric representation of lanes include, e.g., encoding and/or decoding parametric representations into lane lines. In one embodiment, the geographic database 117 include high resolution or high definition (HD) mapping data that provide centimeter-level or better accuracy of map features. For example, the geographic database 117 can be based on Light Detection and Ranging (LiDAR) or equivalent technology to collect billions of 3D points and model road surfaces and other map features down to the number lanes and their widths. In one embodiment, the HD mapping data (e.g., HD data records 511) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 117.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 503, road segment or link data records 505, POI data records 507, feature detection data records 509, HD mapping data records 511, and indexes 513, for example. More, fewer or different data records can be provided. In one embodiment, additional data records (not shown) can include cartographic ("carto") data records, routing data, and maneuver data. In one embodiment, the indexes 513 may improve the speed of data retrieval operations in the geographic database 117. In one embodiment, the indexes 513 may be used to quickly locate data without having to search every row in the geographic database 117 every time it is accessed. For example, in one embodiment, the indexes 513 can be a spatial index of the polygon points associated with stored feature polygons.

In exemplary embodiments, the road segment data records 505 are links or segments representing roads, streets, or paths, as can be used in the calculated route or recorded route information for determination of one or more personalized routes. The node data records 503 are end points corresponding to the respective links or segments of the road segment data records 505. The road link data records 505 and the node data records 503 represent a road network, such as used by vehicles, cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 507. The geographic database 117 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

In one embodiment, the geographic database 117 can also include feature detection data records 509 for storing predicted features, predicted confidence metrics, training data, prediction models, annotated observations, computed featured distributions, sampling probabilities, and/or any other data generated or used by the system 100 according to the various embodiments described herein. By way of example, the feature detection data records 509 can be associated with one or more of the node records 503, road segment records 505, and/or POI data records 507 to support localization or visual odometry based on the features stored therein and the corresponding estimated quality of the features. In this way, the records 509 can also be associated with or used to classify the characteristics or metadata of the corresponding records 503, 505, and/or 507.

In one embodiment, as discussed above, the HD mapping data records 511 model road surfaces and other map features to centimeter-level or better accuracy. The HD mapping data records 511 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 511 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 511 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 511.

In one embodiment, the HD mapping data records 511 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 117 can be maintained by the content provider 127 in association with the services platform 123 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 119) along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 101 or UE 119. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing in-vehicle data selection for feature detection model creation and maintenance may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
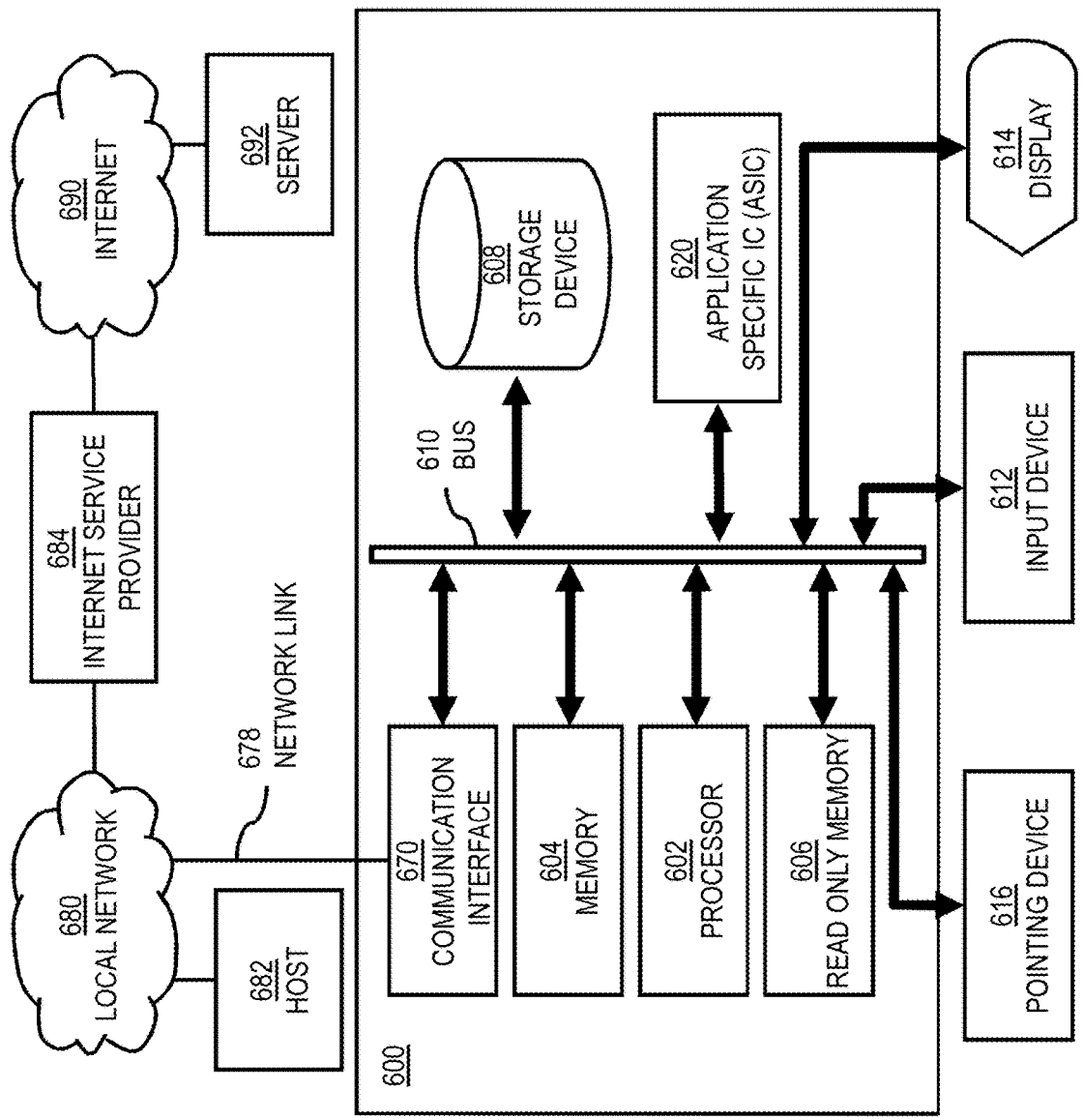
FIG. 6 is a diagram of hardware that can be used to implement an embodiment.

FIG. 6 illustrates a computer system 600 upon which an embodiment of the invention may be implemented. Computer system 600 is programmed (e.g., via computer program code or instructions) to provide in-vehicle data selection for feature detection model creation and maintenance as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing in-vehicle data selection for feature detection model creation and maintenance. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing in-vehicle data selection for feature detection model creation and maintenance. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing in-vehicle data selection for feature detection model creation and maintenance, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610.

Communication interface 670 provides a one-way or two-way communication coupling to a variety of external devices that operate with their own processors, such as printers, scanners and external disks. In general, the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 115 for providing in-vehicle data selection for feature detection model creation and maintenance.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 7 illustrates a chip set 700 upon which an embodiment of the invention may be implemented. Chip set 700 is programmed to provide in-vehicle data selection for feature detection model creation and maintenance as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide in-vehicle data selection for feature detection model creation and maintenance. The memory 705 also stores the data associated with or generated by the execution of the inventive steps.

Figure 8:
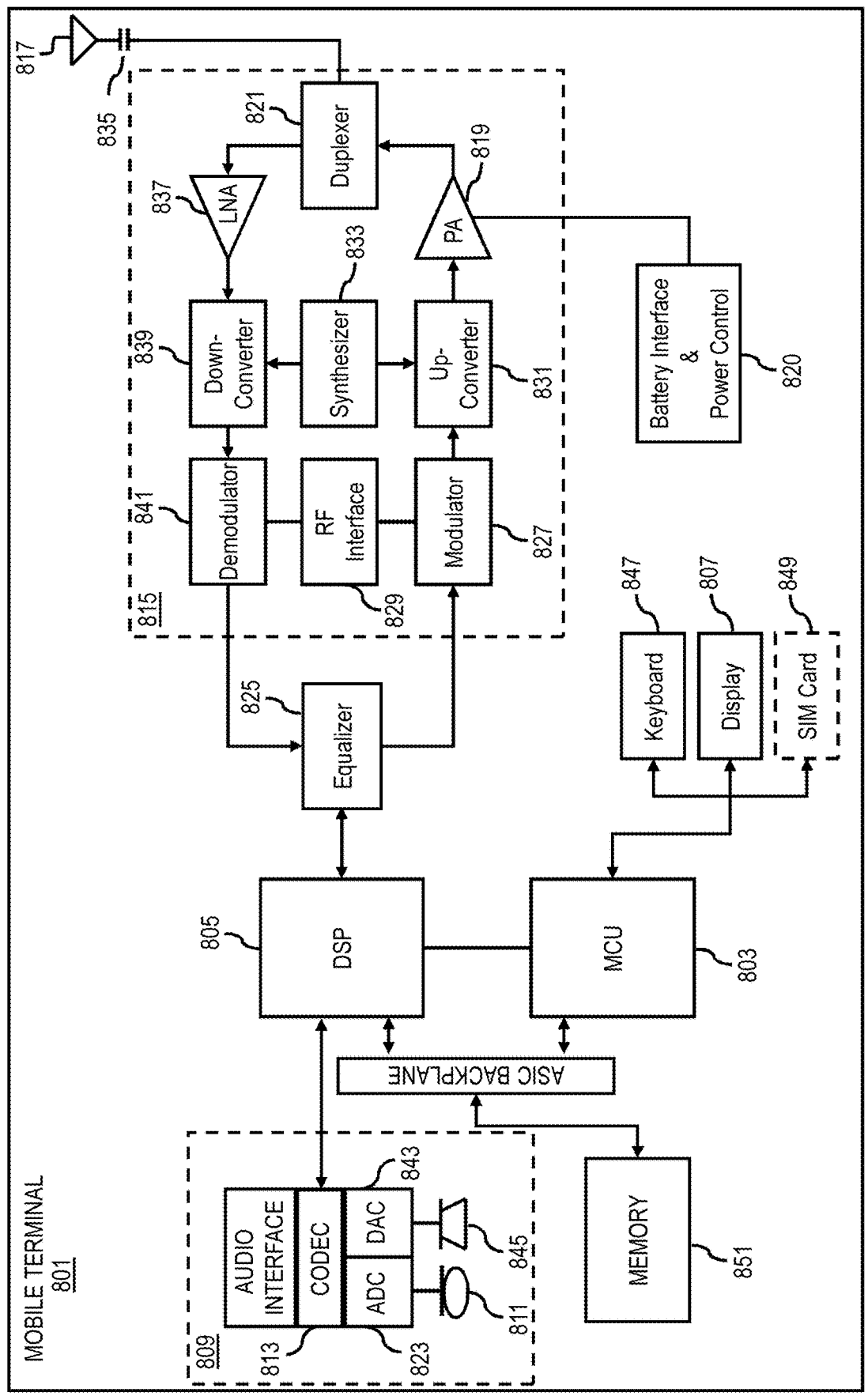
FIG. 8 is a diagram of a mobile terminal (e.g., handset) that can be used to implement an embodiment.

FIG. 8 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to provide in-vehicle data selection for feature detection model creation and maintenance. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for use in an in-vehicle feature detection device comprising an initial machine learning model trained to perform feature detection, the method comprising:

processing, by the initial machine learning model, sensor data collected by a vehicle to output a detected feature and a confidence metric for the detected feature, wherein the confidence metric represents uncertainty associated with road features or objects detected from sensor readings;

selecting a portion of the sensor data having the confidence metric below a confidence threshold;

transmitting the portion of the sensor data to an external server over a communication network;

receiving a second machine learning model over the communication network from the external server, wherein the second machine learning model is created or re-trained to predict the detected feature associated with the confidence metric below the confidence threshold at a desired or configured level of accuracy; and replacing the initial machine learning model with the second machine learning model.

2. The method of claim 1, further comprising:

prior to transmitting the portion of the sensor data, marking the sensor data with a data record indicating that the sensor data is novel based on determining that the confidence metric is below the confidence threshold.

3. The method of claim 2, wherein the external server determines whether to store or process the sensor data based on the marking of the sensor data.

4. The method of claim 1, further comprising:
determining that a privacy policy associated with the vehicle's location, the in-vehicle feature detection device, or a combination thereof restricts the transmitting of the sensor data from the vehicle; and
transmitting other information associated with the sensor data from the vehicle to the mapping platform in place of the sensor data based on determining that the confidence metric is below the confidence threshold.

5. The method of claim 4, wherein the other information includes contextual information associated with a collection of the sensor data, the vehicle, an environment surrounding the vehicle, or a combination thereof.

6. The method of claim 1, wherein the transmitting of the portion of the sensor data by the in-vehicle feature detection device is further based on determining that a location where the sensor data is collected corresponds to a requested location specified by a mapping platform, wherein the requested location is a geo-fenced region of interest.

7. The method of claim 1, wherein the confidence threshold is based, at least in part, on a data storage threshold, a transmission bandwidth threshold, a data sparsity at a target location, or a combination thereof.

8. The method of claim 1, wherein a raw sensor data is not transmitted from the vehicle based on determining that the confidence metric is above the confidence threshold.

9. An apparatus comprising:
at least one processor; and
at least one memory including computer program code for one or more programs, the at least one memory and the computer program code configured to, with the at least one processor, cause the apparatus to perform at least the following:
receive sensor data from an in-vehicle feature detection device over a communication network, wherein the sensor data comprises a detected feature that has a confidence metric below a confidence threshold, wherein the confidence metric represents uncertainty associated with road features or objects detected from sensor readings;
process the sensor data and identify the detected feature;
create or re-train a feature detection model, wherein the feature detection model generates a prediction of the detected feature at a desired or configured level of accuracy; and
transmit the feature detection model to the in-vehicle feature detection device over the communication network to replace an initial feature detection model used by the in-vehicle feature detection device.

10. The apparatus of claim 9, wherein the apparatus is further caused to:
transmit a request to the vehicle to capture data from a geo-fenced region of interest, wherein the sensor data is received in response to the request; and
wherein the sensor data is collected by the vehicle from the geo-fenced region of interest.

11. The apparatus of claim 10, wherein the geo-fenced region of interest is associated with a historical feature detection performance that is below a threshold performance.

12. The apparatus of claim 11, wherein the apparatus is further caused to:
prior to transmitting the sensor data, mark as novel the portion of sensor data wherein the confidence metric is below the confidence threshold;
store the sensor data marked as novel in a permanent storage; and
store the sensor data not marked as novel in a temporary storage.

13. The apparatus of claim 9, wherein the processing of the sensor data to create or re-train the feature detection model includes annotating the sensor data that includes the feature detected with the confidence metric below the confidence threshold with one or more feature labels prior to creation or re-training.

14. The apparatus of claim 9, wherein the apparatus is further caused to:
receive other information over the communication network from the vehicle, wherein:
other information comprises one or more conditions associated with collecting the sensor data in place of the sensor data when a privacy policy of the vehicle, the in-vehicle feature detection device, or a combination thereof restricts transmitting the sensor data externally from the vehicle, and
the one or more conditions comprise road conditions, weather conditions, or a combination thereof; and
transmit a request for the vehicle or another vehicle to capture additional sensor data under the one or more conditions.

15. A non-transitory computer-readable storage medium carrying one or more sequences of one or more instructions which, when executed by one or more processors, cause an apparatus to perform:
processing, by an initial machine learning model trained to perform feature detection, sensor data collected by a vehicle to output a detected feature and a confidence metric for the detected feature, wherein the confidence metric represents uncertainty associated with the detected feature;
selecting a portion of the sensor data having the confidence metric below a confidence threshold;
transmitting the portion of the sensor data to an external server over a communication network;
receiving a second machine learning model over the communication network from the external server, wherein the second machine learning model is created or re-trained to predict the detected feature associated with the confidence metric below the confidence threshold at a desired or configured level of accuracy; and
replacing the initial machine learning model with the second machine learning model.

16. The non-transitory computer-readable storage medium of claim 15, wherein the apparatus is further caused to perform:
determining that a privacy policy associated with the vehicle's location, the in-vehicle feature detection device, or a combination thereof restricts the transmitting of the portion of the sensor data from the vehicle; and
transmitting other information associated with the portion of the sensor data from the vehicle to the external server in place of the sensor data based on determining that the confidence metric is below the confidence threshold.

17. The non-transitory computer-readable storage medium of claim 15, wherein the transmitting of the portion of the sensor data, by the in-vehicle feature detection device, is further based on determining that a location where the sensor data is collected corresponds to a requested location specified by a mapping platform, wherein the requested location is a geo-fenced region of interest.

18. The method of claim 1, wherein the second machine learning model is created or re-trained by a mapping platform using a learner module that:
  feeds feature sets from a labeled sensor data set into the feature detection model to compute a predicted matching probability and a predicted matching feature using an initial set of model parameters;
  compares a predicted matching probability and the predicted matching feature to ground truth data in the labeled sensor data set; and
  adjusts the model parameters until the machine learning model generates the predicted matching feature at a desired or configured level of accuracy.

19. The non-transitory computer-readable storage medium of claim 15, wherein the second feature detection model is created or re-trained by a mapping platform using a learner module that:
  feeds feature sets from a labeled sensor data set into the feature detection model to compute a predicted matching probability and a predicted matching feature using an initial set of model parameters;
  compares a predicted matching probability and the predicted matching feature to ground truth data in the labeled sensor data set; and
  adjusts the model parameters until the machine learning model generates the predicted matching feature at a desired or configured level of accuracy.

20. The non-transitory computer-readable storage medium of claim 16, wherein the other information includes contextual information associated with a collection of the sensor data, the vehicle, an environment surrounding the vehicle, or a combination thereof.

* * * * *